United States Patent [19]

Oosten

[11] 4,038,193
[45] July 26, 1977

[54] METHOD AND DEVICE FOR SEPARATING LIQUIDS AND SOLIDS FROM A MIXTURE

[75] Inventor: Jacob van Oosten, Maarssen, Netherlands

[73] Assignee: De Gooijer's Patent B.V., Rotterdam, Netherlands

[21] Appl. No.: 309,286

[22] Filed: Nov. 24, 1972

[30] Foreign Application Priority Data

Aug. 1, 1972 Netherlands ............ 7210541

[51] Int. Cl.² .................................... B01D 33/04
[52] U.S. Cl. ......................... 210/400; 162/351
[58] Field of Search ........... 210/400, 401, 406, 387, 210/77; 162/351

[56] References Cited

U.S. PATENT DOCUMENTS

| | | | |
|---|---|---|---|
| 2,895,614 | 7/1959 | Komline | 210/401 |
| 2,997,179 | 8/1961 | Gooijer | 210/406 X |
| 3,161,522 | 12/1964 | Compton | 210/400 X |
| 3,289,848 | 12/1966 | Miles | 210/401 |
| 3,375,932 | 4/1968 | Ishigaki | 210/401 |
| 3,502,216 | 3/1970 | Dittman | 210/401 |
| 3,575,850 | 4/1971 | Davidson et al. | 210/401 |

FOREIGN PATENT DOCUMENTS 105,812  8/1963  Netherlands ............ 210/401

*Primary Examiner*—Frank A. Spear, Jr.
*Assistant Examiner*—F. Lander

[57] ABSTRACT

The invention relates to a method and a device for separating liquids and solids from a mixture, in which the mixture is applied in the form of a layer to a movable, endless filter belt, which is supported from a subjacent suction box adapted to move parallel to the belt, in which box a subatmospheric pressure is intermittently produced, the liquid constituents of the mixture being drawn across the filter belt during the periods of subatmospheric pressure, while the filter belt and the suction box are in intimate contact with each other and do not move relatively to each other owing to the suction force, whereas at the restoration of the atmospheric pressure in the suction box a relative displacement of the filter belt and the suction box is carried out.

3 Claims, 7 Drawing Figures

METHOD AND DEVICE FOR SEPARATING LIQUIDS AND SOLIDS FROM A MIXTURE

DESCRIPTION OF THE PRIOR ART

A device for carrying such a method into effect has been proposed in Dutch Patent Specification No. 105,812. This Specification discloses the use of a single suction box, which is returned to its initial position by a spring element, which means that this Specification concerns a device of comparatively low power or low weight without providing the possibility of using more complicated methods of dissociation of mixtures or of extraction.

SUMMARY OF THE INVENTION

According to the invention, the suction box comprises a plurality of relatively separated elements, each of which comprises separately controllable suction means, each of which can be caused to communicate with filtrate- or washing-liquor-distribution nozzles arranged above the filter belt so that a circulation of filtrate and/or washing-liquor across the layer of solid substance lying on the filter belt can be repeated, as the case may be, in a counterflow.

In those cases in which the periods of time required for separation (of a mixture or of a suspension into cake and filtrate) of washing and of extraction, etc. are fairly short, the invention allows a continuous movement of the filter belt, while the suction box elements move together with the belt during the suction period and are returned to the initial positions after the restoration of the atmospheric pressure in the interior.

In those cases in which considerably longer periods of time are required for separation, washing, etc. the invention allows the filter belt and the suction box elements to stand still during the suction period, while at the restoration of the atmospheric pressure in the suction box elements the filter belt is displaced, whereas the suction box elements maintain their positions.

BRIEF DESCRIPTION OF THE DRAWINGS

The invention will now be described, solely by way of example, with reference to the accompanying drawings, in which:-

DESCRIPTION OF THE PREFERRED EMBODIMENTS

Figure 1:
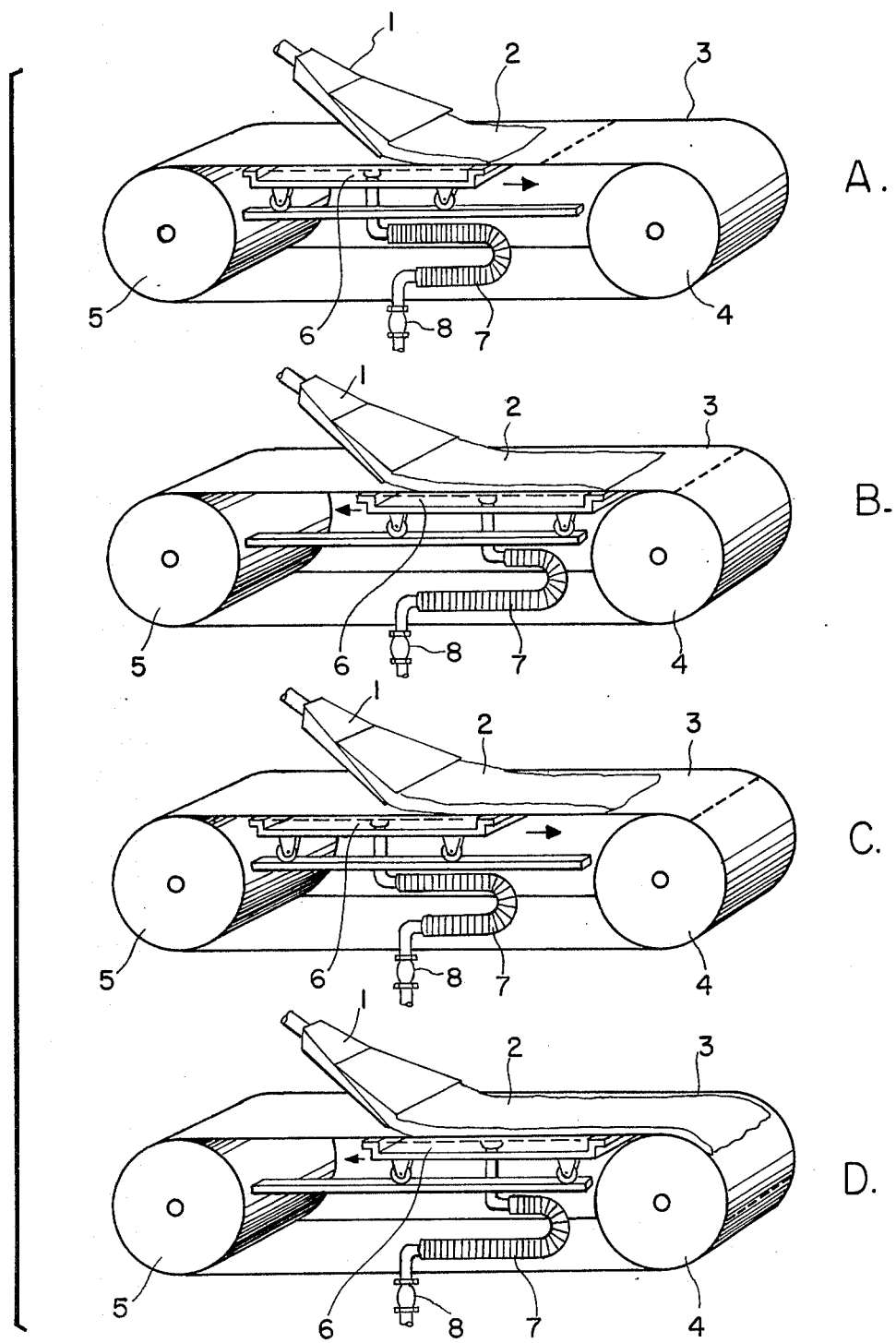
FIGS. 1a, b, c, d show a device in accordance with the known art.

FIGS. 1a, b, c and d show the operation of a device in accordance with the known art. A mixture supply nozzle 1 applies a mixture layer 2 to an endless filter belt 3, which is guided along rollers 4 and 5 to be driven. A suction box 6, adapted to move parallel to the belt, communicates through a flexible duct 7 and a cock 8 either with an exhaust device (not shown) or with the atmosphere. During the suction stroke illustrated in FIG. 1a, the suction box is held by the prevailing internal subatmospheric pressure and carried along by the filter belt in the direction of the arrow. At the end of the suction stroke as illustrated in FIG. 1b, the subatmospheric pressure is obviated by the supply of air so that the filter belt and the suction box are disengaged and the suction box is returned by a mechanism (not shown) to the initial position.

FIGS. 1c and d illustrate a repetition of FIGS. 1a and 1b respectively; the belt carrying the solid substances then mainly free of liquid removed by way of the duct 7 is displaced further to the right.

Figure 2:
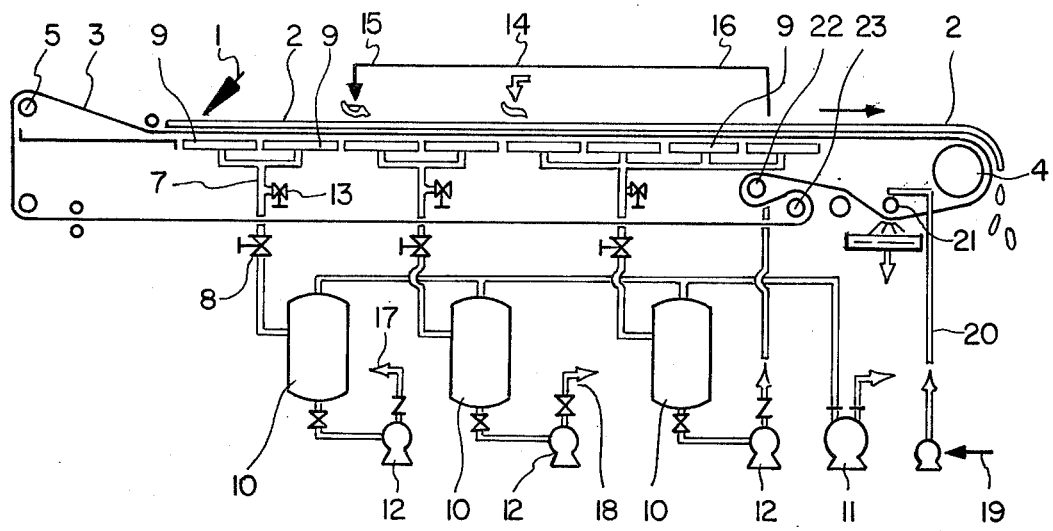
FIG. 2 illustrates schematically the operation of an embodiment of a device in accordance with the invention.

In the schematic view of FIG. 2 the parts corresponding with those of FIG. 1 are designated by the same reference numerals.

The suction box comprises in this case a plurality of relatively separate elements 9, which are provided individually or in conjunction with separately controllable suction means.

By way of example these suction means may be formed by vacuum tanks 10 communicating in common with an exhaust or vacuum pump 11 and communicating individually with an outlet pump 12.

Through the at least partly flexible duct 7 the vacuum tank 10 communicates with one or more suction box elements 9. This duct is provided in this case with a vacuum closing member or valve 8 and a lateral air closing member or valve 13.

Through washing-liquor distribution nozzles 14, 15 a washing liquor can be distributed over the filtered layer, for example at 14, and/or it may be redistributed in a counterflow at 15. For this purpose, the nozzle 15 may communicate through a duct 16 with a drain pump 12.

Further drain pumps 12 may conduct away the filtrate, for example at 17 and the concentrated washing liquor at 18.

A tissue-washing pump 19 with a duct 20 and a spraying pipe 21 is provided to clean the tissue of the filter belt by a tissue washing agent to remove residual solid substances, the main portion of which is delivered when the belt passes the roller 4.

An adjustable guide roller 22 constitutes, together with the guide roller 23, a belt stretching device. The roller 4 is driven.

Figure 3:
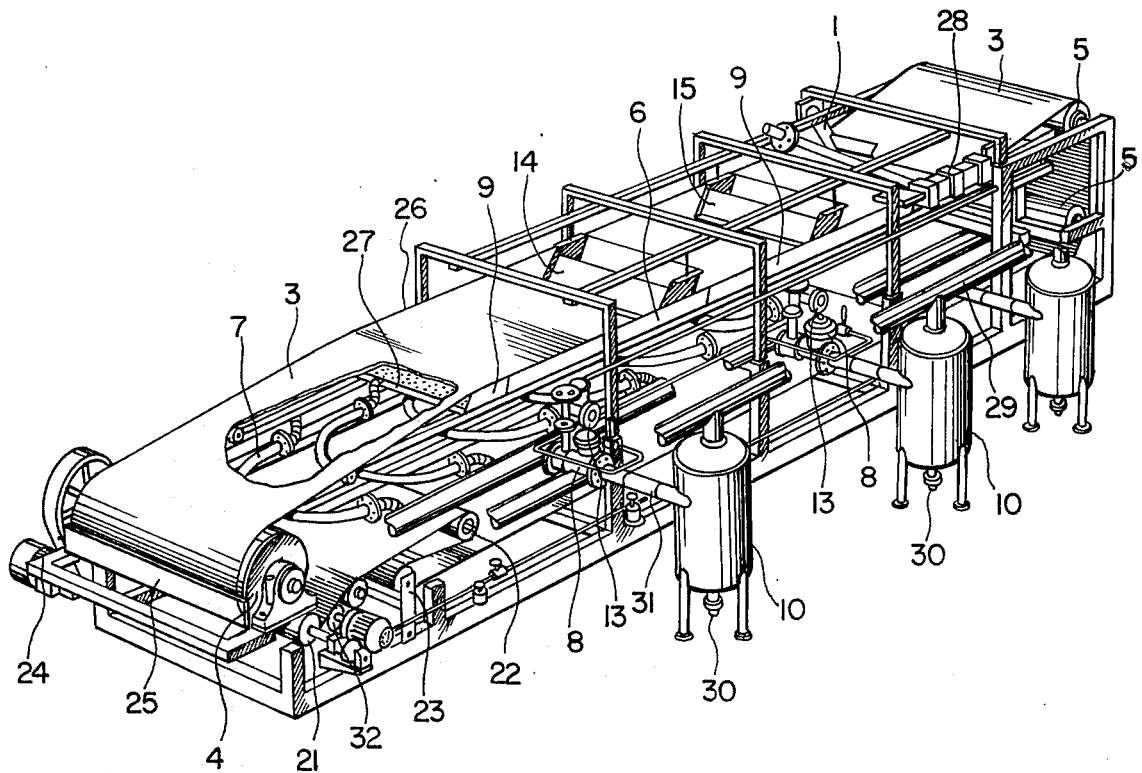
FIG. 3 is a partly developed view of a device embodying the invention in a detailed, perspective view.

In the partly developed view of FIG. 3 the parts corresponding with those of FIGS. 1 and 2 are designated by the same reference numerals.

The driving roller 4 is driven by an electric motor with a change-speed gear designated as a whole by 24. A scraper 25 is provided to remove substantially completely the filtered and, if desired, washed solid substances in the form of a cake from the filter belt.

The suction box elements 9 are provided with upwardly inclined sides and perforated bottom plates 26, which may be removable and which are held by supporting gratings 27.

Reference numeral 28 denotes the pneumatic cylinder for driving the train of suction box elements 9.

The duct connecting the vacuum tanks 10 in common with the exhaust pump is designated by 29.

Reference numeral 30 designates the outlet ducts for liquid to the drain pumps and 31 denotes the communications between the vacuum tanks and the vacuum closing members 8.

After the oscillating spraying pipe 21 has been passed by, the filter tissue can be further cleaned with the aid of a rotatable brush 32.

Above the portion of the filter belt near the driving roller 4 drying members (not shown) may be arranged. The whole device may be surrounded by a cabinet (not shown) for operation, for example, in a nitrogen atmosphere, for example, at excess pressure.

The filter belt may be arranged so as to be readily replaceable, for example, by means of a zipper (not shown).

A pneumatic tissue guiding device known from the textile industry prevents the filter belt from deviating sideways.

Figure 4:
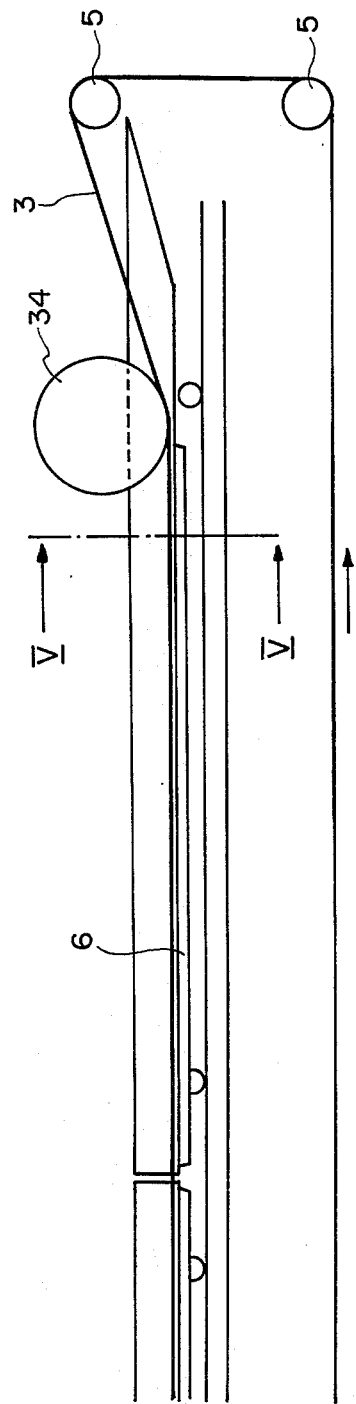
FIG. 4 is a schematic, partially longitudinal sectional view of an embodiment.
Figure 5:
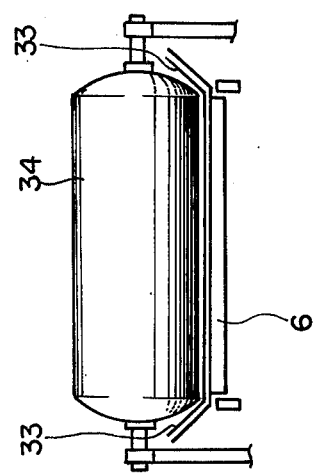
FIG. 5 is a sectional view taken on the line V—V in FIG. 4.

FIGS. 4 and 5 show furthermore a member for guiding the flat filter belt along the two upwardly inclined sides of the suction box elements.

FIG. 5 is a sectional view taken on the line V—V in FIG. 4 in the direction of the arrows.

After having passed over the upper guide roller 5 the filter belt is guided downwardly in inclined position under a rotatable cylinder 34, the two end faces of which are spherical; in this way the state of flat stress in the tissue is temporarily eliminated.

The slightly elastic filter belt 3 thus forms two upwardly inclined side strips 33, which match the corresponding sides of the suction box elements. In this way the layer of mixture, which is initially still liquid, is prevented from leaking away between the edges of the filter belt and the upright sides of the suction elements.

Figure 6:
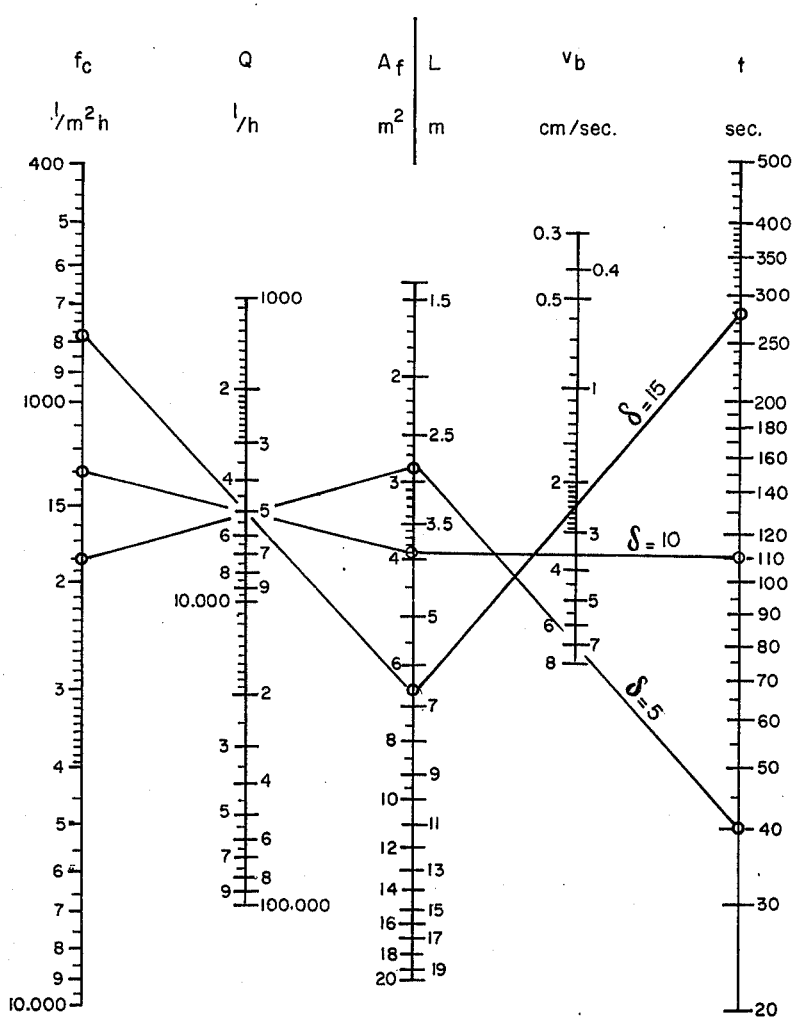
FIG. 6 is a nomograph for determining the dimensions and speed of the filter belt.

The nomogram of FIG. 6 serves for determining the dimensions of the filter belt and the speed of the belt. In FIG. 6, $f_c$ = filtration factor
$Q$ = slurry supply
$A_f$ = filtration surface
$L$ = filter length
$v_b$ = speed of the belt
$t$ = time of filtration
$\delta$ = thickness of the cake.

EXAMPLE:

Data: For a given product the filtration periods, in accordance with Buchner tests, amount to 40, 110 and 280 sec. for cake thicknesses of 5, 10 and 15 mms respectively. The filtration factor $f_c$, derived from the periods of time measured, is 1800, 1300 and 775 $1/m^2h$ respectively.

The required production is 5000 liters of slurry an hour.

What are the required filtration proportions for the separation and the speed of the belt;

SOLUTION:

The net filter surface $A_f$ results from the relationship between the filtration factor $f_c$ and the capacity Q.

The belt speed $v_b$ results from the relationship between the net lenght L and the filtration time $t$. Since in this case the width of the belt is assumed to be 1 meter, the scale of length is equal to the scale of filter surface; in this case the optium thickness of the cake is about 10 mm for a net length of about 4 ms and a speed of the belt of about 3 .5 cms/sec. With a smaller thickness of the cake the speed of the belt is too high and with a thicker cake the filter will be too long.

REMARKS:

Washing requires the same procedure.

Finally, the complete filter length is determined by the total of separation, washing and drying paths.

By recapitulation, it may be noted that in accordance with the invention a device is obtained which permits of carrying out, over its overall length, a method which required a plurality of devices in accordance with the known state of the art. This method may comprise:

a. pre-coating with the proper product (mixture), b. separation of the suspension (mixture) into cake and mother filtrate;

c. washing/extraction treatments in sections either in direct flow or in counterflow with unrestricted possibility of counter-washing, d. drying to be carried out on the filter belt in a drying section.

What we claim is:

1. A device for separating liquids and solid substances from a mixture, comprising:
    a movable, endless filter belt driven by a driving roller and an adjustable driving gear;
    a mixture supply nozzle positioned above the belt;
    a suction box subjacent the belt and adapted to move parallel to the belt and communicating through a flexible duct with a vacuum device;
    means for connecting the suction box alternately with the vacuum device or with atmosphere;
    a pneumatic cylinder for displacing the suction box parallel to the belt, the pneumatic cylinder being coupled to the driving gear to selectively move the suction box and belt toghether and separately return the suction box;
    the suction box comprising a plurality of relatively separate elements, each of the separate elements communicating through a separate flexible duct with a separate suction means communicating with the vacuum device, each suction means having a filtrate outlet;
    said device further provided with distribution nozzles arranged at intervals above the belt along the direction of movement of the belt, the distribution nozzles being optionally connected by distribution means to at least one of the filtrate outlets and a supply of at least one washing liquor, whereby the filtrate from each element is kept separate and said solid substances on the belt can be washed with filtrate from at least one filtrate outlet and with at least one washing liquor.

2. A device as claimed in claim 1, in which the suction box elements can be displaced by means of a pneumatic cylinder and the filter belt can be moved by means of a driving roller with an adjustable driving gear, the pneumatic cylinder and the roller drive being adpated to be coupled intermittently with equal speeds and directions and to be decoupled at different speeds of the box elements and the belt.

3. A device as claimed in 2 which the filter belt extends between the driving roller and a scraper.

* * * * *